United States Patent [19]
Kyhl

[11] Patent Number: 4,795,252
[45] Date of Patent: Jan. 3, 1989

[54] OVERHEAD PROJECTOR

[75] Inventor: Henry Kyhl, Englewood, N.J.

[73] Assignee: buhl Industries, Inc., Fair Lawn, N.J.

[21] Appl. No.: 53,715

[22] Filed: May 26, 1987

[51] Int. Cl.⁴ ............................................. G03B 21/00
[52] U.S. Cl. ............................ 353/122; 353/DIG. 3; 353/DIG. 6; 353/98; 353/DIG. 5
[58] Field of Search .................................. 353/65–67, 353/119, 122, DIG. 1–6, 22–24, 44–45; 248/451, 453, 449; 108/6; 350/121; 269/319, 315

[56] References Cited

U.S. PATENT DOCUMENTS

| | | | |
|---|---|---|---|
| 1,598,569 | 8/1926 | Fitzhugh | 248/449 X |
| 2,273,361 | 2/1942 | Kozloff | 248/449 |
| 2,529,664 | 11/1950 | Roysher | 353/DIG. 3 X |
| 2,699,704 | 1/1955 | Fitzgerald | 353/DIG. 3 X |
| 2,772,485 | 12/1956 | Gelb | 33/616 |
| 2,811,892 | 11/1957 | Holloway | 353/DIG. 3 X |
| 3,366,005 | 1/1968 | Benedict | 353/DIG. 3 X |
| 3,542,463 | 11/1970 | Klein | 353/DIG. 5 X |
| 3,653,754 | 4/1972 | Yamanaka | 353/DIG. 3 X |
| 3,889,914 | 6/1975 | Torme | 248/451 X |

Primary Examiner—Harry N. Haroian
Attorney, Agent, or Firm—McAulay, Fields, Fisher, Goldstein & Nissen

[57] ABSTRACT

A portable overhead projector has a top surface which slopes downwardly from the rear wall to the front wall and includes stops on the top surface adjacent to the front wall for preventing a transparency from sliding off the top surface during use and to preset the distance of the leading edge of the transparency from the bottom edge of the protecting wall.

4 Claims, 2 Drawing Sheets

OVERHEAD PROJECTOR

BACKGROUND OF THE INVENTION

The present invention relates to an overhead projector and in particular to a desk top portable overhead projector for projecting transparencies on a remote screen.

Prior art overhead projectors of this type include a horizontal planar top surface. When the user desires to place a transparency on the projector, the user must move the transparency about and into position in order to align it properly so that it will be shown on the screen. This, is distracting to both the viewer and the projectionist.

SUMMARY OF THE INVENTION

The main object of the present invention is to improve prior art overhead projectors and to provide an overhead projector which virtually automatically aligns the transparencies with the bottom edge of the glass surface projection area.

In accordance with the present invention, the overhead projector has a sloping top projection surface that tapers downwardly from rear to front. Adjustable transparency stops are provided at the bottom of the projection area to accommodate differently sized transparencies. As a result of the tapering surface add the adjustable stops, the transparency will immediately be properly positioned with its bottom edge in proper alignment on the support glass or plate. Gravity will cause the transparency to move downwardly until the bottom edge of the transparency engages the stops. Thus, the transparency can simply be thrown onto the glass surface and the bottom edge of the transparency will engage the stops so that the bottom edge of the transparent area of the transparency will be aligned with the bottom edge of the glass surface projection area.

The stops are preferably comprised of rotatable longitudinally spaced rods or pins. In one position, with the pins aligned parallel to each other, the pins will support the bottom edge of the transparency at the top of each pin. Alternatively, the pins can be rotated 90° so that they are colinear. In this position, the pins will support the bottom edge of the transparency along the entire length thereof. For odd size transparencies, the pins may be rotated to an intermediate position so that the transparency will be properly aligned with respect to the projection area.

Another feature of the present invention is the manner in which a support bar for the overhead lens is mounted on the housing. A knurled knob holds the support rod in position. The knob may be loosened and the support rotated so that it is parallel with the housing for carrying purposes.

Still another feature of the present invention resides in the fact that the sloping surface permits the projector to be used as a podium. The sloping surface permits one to read notes that are either on the projector or on the margin of the transparency, without being blinded by the light, since the projection surface is viewed at such an angle that the light does not interfere with the person reading the material. In accordance with this aspect of the present invention, a reading light is preferably mounted in the vicinity of or on the overhead lens housing and a switch can be provided which turns on the reading light and turns off the projector light when one uses the projector as a podium.

These and other features and advantages of the present invention will be more fully explained in the following detailed description of the invention and the accompanying drawings, wherein:

DETAILED DESCRIPTION OF THE INVENTION

Figure 1:
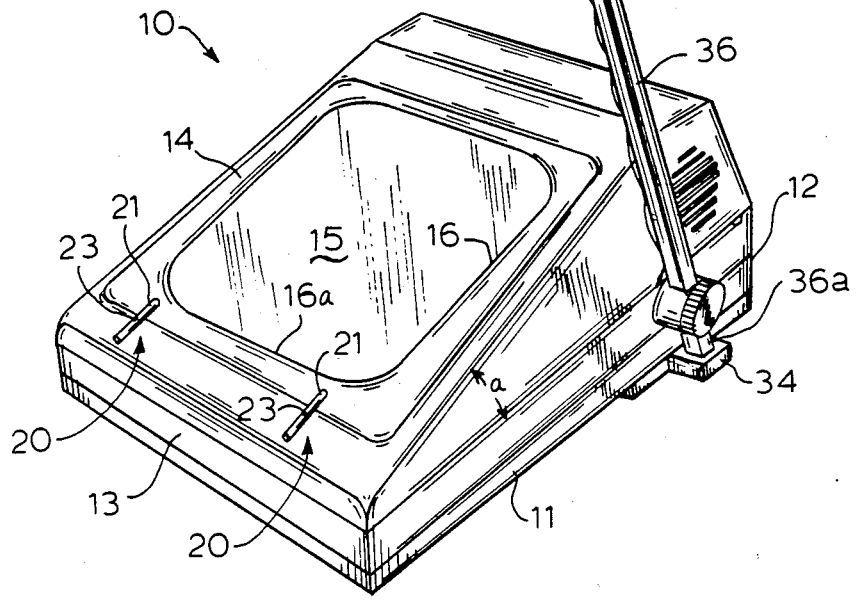
FIG. 1 is a perspective view of the projector constructed according to the present invention.
Figure 2:
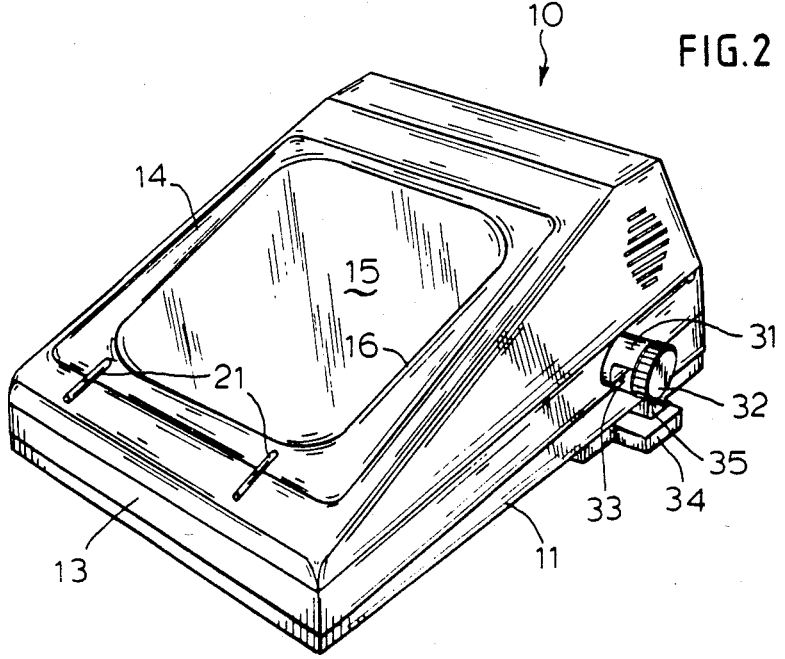
FIG. 2 is a perspective view of the housing shown in FIG. 1.

Referring now to FIGS. 1-4, the overhead projector 1 according to the present invention includes a housing 10 having the base 11 designed to rest on a horizontal surface such as a desk top or a table top, a rear wall 12, a front wall 13 and a top surface 14 including a glass projection plate 15. A light source, not shown, and disposed within the housing, projects light through the glass plate 55 within the perimeter or projection area 16 which has a bottom edge 16a.

The housing 10 also includes stop means 20 comprising pins or rods 21 rotatably mounted on the top surface 14 about pivot axes 23 which are perpendicular to the sloping top surface 14 and to the longitudinal axes of each of the pins 21. The stop means 20 will be disclosed in more detail hereinafter.

The top surface 14 is disposed at an angle a to base 11, with angle a being in the range of from 20° to 40°, preferably 30° as shown. This slope of surface 14 is downwardly from the rear surface 12 to the front surface 13.

The projector 1 further comprises an overhead lens 40 which is located in projecting position by a support 30. Support 30 includes a rotatably mounted cylindrical member 31 having a square shaped passage 33 therein and a knurled knob 32 which is threadedly connected to member 31. When rod 36 is inserted in passage 33 and the knob 32 is turned relative to member 31 to tighten the same, rod 36 is locked in position with one end 36a disposed in square slot 35 in member 34. This maintains the rod 36 in the operable or projecting position shown in FIGS. 1 and 3 (dotted lines). When knob 32 is loosened, rod 36 can be slid upwardly so that end 36a comes out of slot 35 and the rod 36 can be rotated as shown by the arrow A in FIG. 3 to a position alongside the housing 10 and thus placed in a storage or transporting position.

The other end 36b of rod 36 has a conventional clamp member 46 connected thereto which is clamped in place by means of knob 47 to lock it in desired position along the rod 36. Also received in clamping member 46 is L-shaped support member 45 which is connected to the overhead lens assembly 40 as shown.

The overhead lens assembly 40 includes a clam shaped housing including members 41 and 42 which are pivotally connected to move from a closed position to the open position shown in FIG. 1. Member 42 has lens 43 disposed therein and member 41 has a mirror 44 thereon.

Also connected to the support member 45 is a reading lamp assembly 50 including a clamping member 52 and a clamping screw 53 and a light hood 51 in which a bulb sits. A power cord 54 is connected thereto and runs into the housing for obtaining power from the circuitry within housing 10 and not shown. The projector may be provided with a switch that automatically turns off the projection lamp and turns on the overhead lamp.

Figure 4:
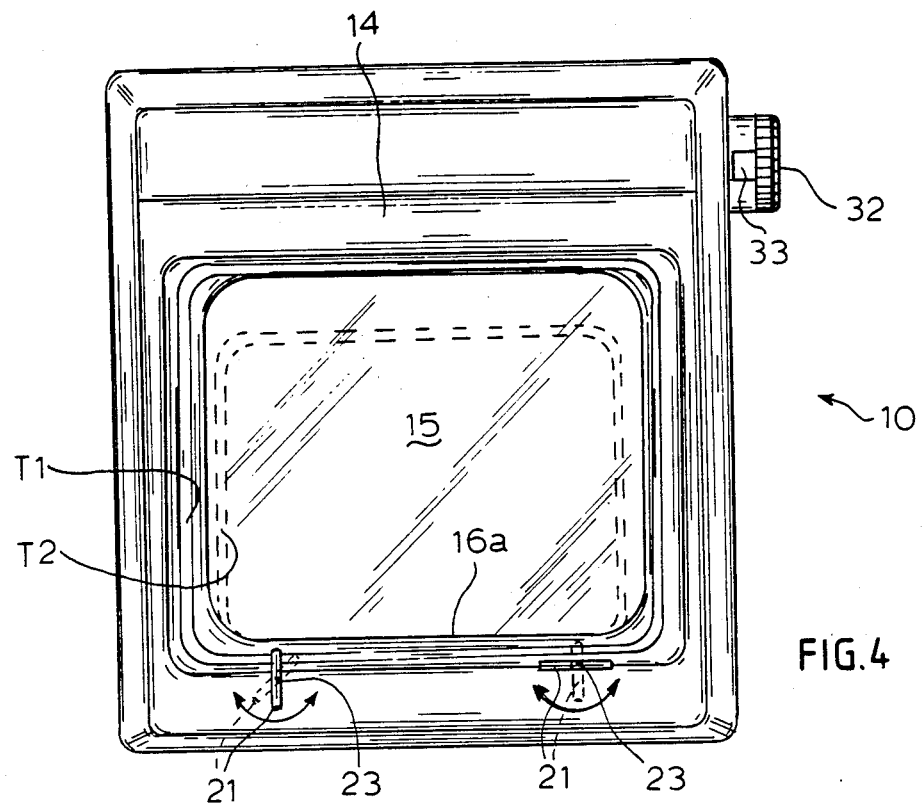
FIG. 4 is a top view of the housing of FIG. 1 with a transparency in position.
Figure 3:
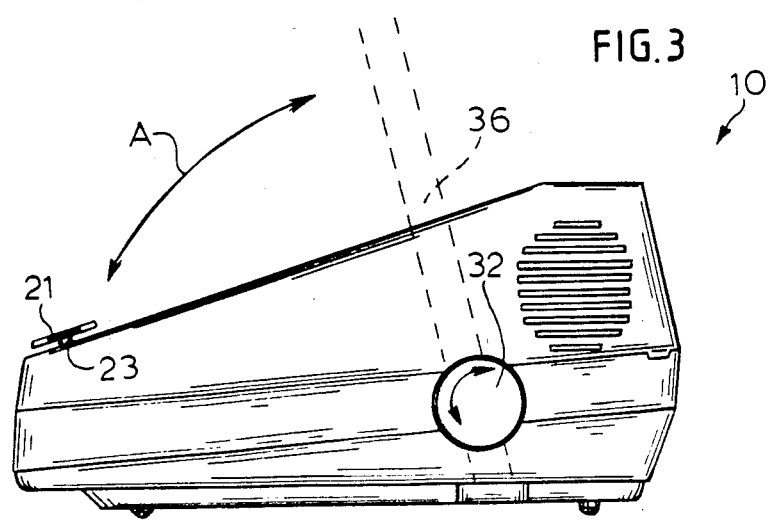
FIG. 3 is a side view of the housing shown in FIG. 1.

The stop members 21 are rotatable as shown in FIG. 4 between the position shown in phantom lines to the position shown in solid lines so as to accommodate different size transparencies. As shown in FIG. 4, when a transparency T1 having a larger boarder is disposed on the projector, the members 21 are disposed in their horizontal position shown in solids lines so as to align the transparent portion of the transparency with edge 16a of the projection surface. When, on the other hand, a transparency having a narrower boarder such as that of T2 is utilized, the members 21 are placed in their vertical and mutually parallel position shown in dotted lines so that the bottom edge of the transparent portion of transparency T2 is aligned with edge 16a.

Thus, when a user has a set of transparencies which are of the same design, a single setting of members 21 will enable the transparencies to be automatically aligned with the viewing area without any need for further adjustments.

If a transparency has a slightly different boarder size other than the ones shown for transparencies T1 and T2, members 21 an be adjusted to intermediate positions between the two shown in FIG. 4. Moreover, in most cases, the slope of the top surface of the projector will cause the transparency to slide down until the bottom edge rests against the stops thereby automatically aligning the transparency with the projection area.

It will be appreciated that the instant specification and claims are set forth by way of illustration and not limitation, and that various modifications and changes may be made without departing from the spirit and scope of the present invention.

What is claimed is:

1. In an overhead projector having a housing having a light source therein and including a base for resting on a horizontal surface, a rear wall, a front wall and a top surface having a projection area on which a transparency maybe disposed and through which light passes from the light source, the improvement wherein the top surface slopes downwardly from the rear wall to the front wall and further comprising rotatable and infinitely variable stop means on the top surface adjacent the front wall engageable with the edge of a transparency in a selected one of said infinitely variable positions for aligning the transparency with said projection area, said stop means including adjustable stop means for presetting the distance of a leading edge of transparency from the front wall, said adjustable stop means comprising two spaced apart rods each rotatably mounted on said top surface about an axis disposed perpendicular to the top surface and the longitudinal axis of the rod and intermediate the ends thereof.

2. The projector according to claim 1, further comprising an overhead lens, and support means mounting the overhead lens in projecting position over said projection area, said support means comprising a support bar connected to said housing, and a support member connected between said support bar and said lens, and connecting means for connecting said support bar to said housing for movement between an operating position and a storage position.

3. The projector according to claim 2, wherein the means connecting the support bar to the housing includes a slot slidably receiving said bar therein, and clamping means for clamping said bar in a desired position in said slot.

4. The projector according to claim 2, further comprising a reading light disposed on the overhead lens.

* * * * *